Mar. 5, 1929. E. KOLLMAR 1,703,940
PLATED WIRE AND PROCESS OF MANUFACTURING SAME
Filed July 23, 1925

Inventor:
Emil Kollmar,
By Emery, Booth, Janney & Varney
Attys.

Patented Mar. 5, 1929.

1,703,940

UNITED STATES PATENT OFFICE.

EMIL KOLLMAR, OF PFORZHEIM, BADEN, GERMANY, ASSIGNOR TO GENERAL PLATE COMPANY, OF ATTLEBORO, MASSACHUSETTS, A CORPORATION OF RHODE ISLAND.

PLATED WIRE AND PROCESS OF MANUFACTURING SAME.

Application filed July 23, 1925. Serial No. 45,643.

This invention relates to plated wire and process of manufacturing the same and consists in improvements which greatly simplify and cheapen the production of such a material.

The invention will be best understood by reference to the following description when taken in connection with the accompanying illustration of one specific embodiment thereof, while its scope will be more particularly pointed out in the appended claims.

In the drawings,—

In the process of manufacturing plated wire as usually carried out, the wire is drawn, rolled or otherwise formed by some mechanical attenuating process from an ingot. The latter is prepared by first forming a shell of the precious plating metal, into which there is forced a core of base metal covered with a thin coating of silver or other solder, the shell being subjected to a drawing or other process suitable to securely seat the shell on the core, and then heated to a sufficient temperature to unite the core to the outer shell of precious metal through the bonding action of the silver solder. The operation of preparing an ingot in this fashion involves considerable time and expense owing to the large number of steps required in preparing the plating metal shell and the waste which results from blanking out the shell.

In carrying out the illustrative form of the present invention, the ingot is prepared by covering the base metal core with a coating of precious plating metal in sheet form which is merely wrapped snugly around the core with a slight overlap, the wrapped core being then subjected to a relatively simple process which results in welding the precious metal covering to the base metal core and in welding together the overlapping edges of the precious metal covering.

Figure 1:
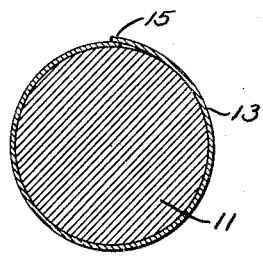
Fig. 1 is a cross sectional view of a bar or core of base metal with a covering of precious metal in sheet form wrapped about the core to provide overlapping edges and designed to form an ingot for wire manufacture.
Figure 2:
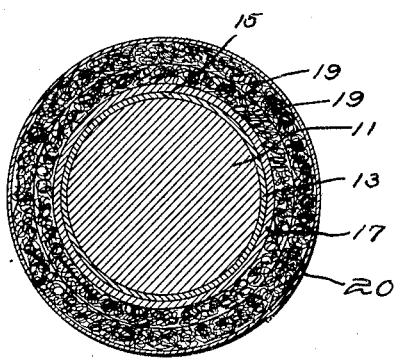
Fig. 2 shows the wrapped core encased within a steel or other shell or jacket covered with a heat insulating covering of asbestos and prepared for the welding operation.
Figure 3:
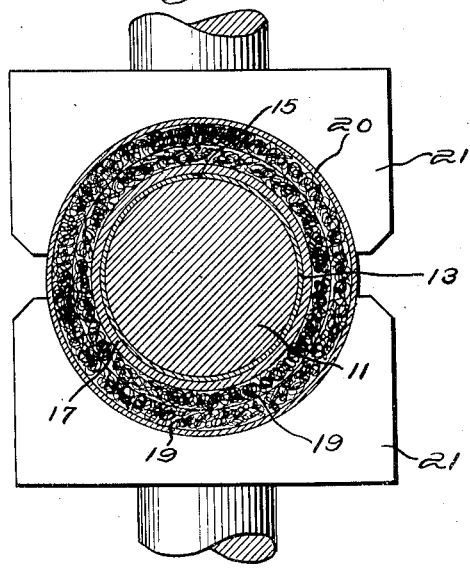
Fig. 3 illustrates the prepared ingot when subject to the welding pressure of a suitable press.

Referring to the drawings and to the illustrative embodiment of the invention, the ingot is there prepared by providing a base metal core in the form of a cylindrical bar 11 of relatively inexpensive metal, such, for example, as brass or nickel silver. The dimensions are immaterial, but, for sake of example, the core might be 12 or 14 inches long and 1.43 inches in diameter. About the core there is then wrapped a covering comprising a thin sheet 13 of precious plating metal which may be of gold, silver or other relatively precious metal, or any one of the numerous alloys thereof. The covering 13 is preferably formed from a sheet of the same length as the core 11 and of a width sufficient to provide a slight overlap 15 (see Fig. 1) at the edges of the sheet when the latter has been wrapped around the core. The thickness of the sheet will vary according to the quality of the plated wire desired, but, as a purely illustrative example, it may consist of a sheet approximately .01 of an inch thick and providing an overlap of about .04 of an inch. Before the sheet is wrapped about the core care should be taken that the surface of the core and the inner contacting surface of the sheet are thoroughly clean.

The wrapped core thus prepared is then inserted in a cylindrical shell or jacket 17, the latter being of a length equivalent to that of the core and of such diameter that the wrapped core can be readily forced into it. One purpose of the shell is to confine the wrapped core closely within a substantially inexpansible jacket for the subsequent pressing operation, and the material of the shell should be suitable for that purpose. The jacket also prevents the access of air to the surfaces of the plating metal and the core which are to be united. As a further purely illustrative example, a shell adapted for use with the core and covering of the dimensions indicated might consist of a steel cylinder, the walls of which are approximately .032 of an inch thick.

The wrapped and jacketed core is then subjected to a process designed firmly to seat and compress the jacket against the wrapped core. This result may be conveniently secured by drawing the jacketed core through a die such that the shell is tightly compressed and squeezed against every part of the wrapped core. The jacket is next encased in some insulating material, which can be conveniently done by wrapping the same with one or more layers of asbestos 19, after which the asbestos is fastened in place as by wrapping it with a piece of sheet iron 20, which latter may be squeezed or compressed about the asbestos by means of a suitable press.

The material for the ingot having been thus prepared, the wrapped or jacketed core is then heated to a temperature which is somewhat less than the temperature of melting point of the gold or other plating metal used, which temperature will obviously vary with the different plating metals and the different alloys thereof which are employed. For what is commonly termed "green gold" this temperature should preferably be somewhat below 1350 degrees Fahrenheit. When brought to the required temperature, the steel jacketed and wrapped core, with its outer insulating covering, is placed between suitably formed dies 21 of a hydraulic or other press, and while still maintained at substantially the aforesaid temperature is subjected to pressure. The action of the pressure on the ingot is to somewhat lower the melting point of the gold or other plating metal, the degree of pressure selected being sufficient to soften the plating metal and under the confining action of the surrounding steel jacket to cause the overlapping edges 15 to be welded to each other, and the contacting surfaces of the base metal core and the precious metal coating to be uniformly welded together throughout the circumference and length of the core. The pressure required to accomplish this result will vary with the character of the plating metal, but for green gold heated to somewhat below 1350 degrees Fahrenheit a pressure of 24,000 pounds per square inch will secure satisfactory results.

The welded ingot is then taken from the press, the sheet iron covering with the asbestos or other heat insulating covering removed, and the steel shell stripped from the ingot. The shell may be readily removed by making a slight incision in the wall of the shell at the end of the ingot and from that point peeling it off in helical strips.

Figure 4:
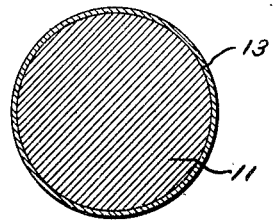
Fig. 4 illustrates the ingot with its welded coating of precious metal after withdrawal from the press and after removal of the asbestos covering and confining jacket.

This leaves the ingot in the form shown in Fig. 4, with the thin sheet of gold or other precious metal coating firmly welded to the core throughout the entire surface of the latter and with the overlapping edges of the sheet firmly and smoothly welded together leaving a smooth, unbroken surface for the plating metal over the entire surface of the ingot.

From the ingot thus produced, wire of any desired diameter may be fabricated by a succession of rolling processes in the usual manner, or other mechanical methods, such as drawing, may be employed for reducing the ingot to the desired attenuated form. Such attenuation processes are well known to those skilled in the art.

While the plating metal has been referred to in the illustrative example as a precious metal, such as gold or other precious alloy, it may be composed of a relatively low grade alloy, or occasion may arise where it is desirable to employ for the plating metal a sheet metal which itself consists of sheet metal in plated form, that is to say, with a cheap metal base and a plated surface of more precious metal.

The foregoing process may be employed in slightly modified form, utilizing the supplementary binding action of a suitable solder. For example, the base metal core and plating metal sheet having been prepared, a sheet of solder may be cut to the same size as the plating metal sheet. In the illustrative example given this might consist of silver solder approximately .005 of an inch thick. The solder is then placed on the sheet of plating metal and the two wrapped around the base metal core with the solder inside, the wrapped core being then inserted in the steel shell and the process otherwise carried out as heretofore described. Instead of using sheet solder, the latter might be applied in some other manner as by dipping the base metal core in a bath of metal solder and thereby coating the same with solder before being wrapped with the sheet of plating metal.

While there is herein shown and described for the purpose of illustration one specific form of the invention and the steps in detail for carrying it out, it is to be understood that extensive deviations may be made therefrom and various modifications utilized, all without departing from the spirit thereof.

Claims:

1. The process of manufacturing plated wire which consists in covering a cylindrical base core to completely envelop the curvilinear surface of the same with precious plating metal in thin sheet form, the latter having overlapping edges, compressing the sheet plating metal uniformly about and against the surface of the core by applying to the core a tightly fitting metallic jacket, squeezing the jacket about the covered core, encasing the jacket with a yieldable, heat-insulating material, heating the jacketed and covered core to a temperature less than the melting temperature of the plating metal, subjecting the jacketed and covered core while heated to a welding pressure, removing the heat-insulating casing and the jacket, and subjecting the cylindrical plated core to an attenuating process to form plated wire.

2. The process of manufacturing plated wire which consists in covering a base metal core to envelop the surface of the same with plating metal in thin sheet form, compressing the sheet plating metal uniformly about and against the surface of the core and forcibly holding the same compressed thereagainst, encasing the held, covered core in a jacket of yieldable, heat-resisting material, heating the jacketed and covered core to a temperature less than the melting temperature of the plating metal, subjecting the same to a welding pressure, and subjecting the plated core to an attenuating process to form plated wire.

3. The process of manufacturing plated wire which consists in covering a cylindrical base metal core to envelop the curvilinear surface of the same with plating metal in thin sheet form, compressing the sheet plating metal uniformly about and against the surface of the core by applying to the core a tightly fitting metallic jacket, squeezing the jacket about the core, heating the jacketed and covered core to a temperature less than the melting temperature of the plating metal, subjecting the heated, jacketed, covered core to a welding pressure, removing the metallic jacket, and subjecting the cylindrical plated core to an attenuating process to form plated wire.

4. The process of manufacturing plated wire which consists in covering a base metal core to envelop the surface of the same with plating metal in thin sheet form, compressing the sheet plating metal uniformly about and against the surface of the core by applying to the core a tightly fitting metallic jacket, heating the jacketed and covered core to a temperature less than the melting temperature of the plating metal, subjecting the heated, jacketed, covered core to a welding pressure, removing the metallic jacket, and subjecting the plated core to an attenuating process to form plated wire.

5. The process of manufacturing plated wire which consists in covering a cylindrical base metal core to envelop the curvilinear surface of the same with plating metal in thin sheet form, compressing the sheet plating metal uniformly about and against the surface of the core and forcibly holding the same compressed thereagainst, heating the held, covered core to a temperature less than the melting temperature of the plating metal, subjecting the heated, held, covered core to a welding pressure, and subjecting the cylindrical plated core to an attenuating process to form plated wire.

6. The process of manufacturing plated wire which consists in covering a cylindrical base metal core to envelop the curvilinear surface of the same with precious plating metal in thin sheet form, compressing the sheet plating metal uniformly about and against the surface of the core by applying thereto a tightly fitting metallic jacket, heating the jacketed, covered core to a temperature less than the melting temperature of the plating metal, uniting the sheet metal covering to the base metal core, removing the jacket, and subjecting the cylindrical plated core to an attenuating process to form plated wire.

7. The process of manufacturing plated wire which consists in covering a base metal core to envelop the surface of the same with plating metal in thin sheet form, compressing the sheet plating metal uniformly about and against the surface of the core and forcibly holding the same compressed thereagainst, heating the held, covered core to a temperature less than the melting temperature of the plating metal, uniting the sheet metal covering to the metallic core, and subjecting the plated core to an attenuating process to form plated wire.

8. As a new article of manufacture, plated wire comprising a thin sheet of gold or gold alloy covering the curvilinear surface of a base metal core of cylindrical cross section in continuous contacting relation therewith and united thereto throughout substantially the entire area of contact, the edge portions of said sheet being united to each other to present a smooth, unbroken surface and said precious metal sheet as united to the core being of substantially uniform texture and thickness longitudinally and circumferentially.

9. As a new article of manufacture, plated wire comprising a thin sheet of precious metal covering the curvilinear surface of a relatively thick base metal core of cylindrical cross section, said sheet having overlapping edges and being in continuous contacting relation to the core, welded thereto through substantially the entire area of contact and uniformly distributed lengthwise the core, the overlapping edges of the sheet being welded to each other and presenting a smooth, unbroken surface.

In testimony whereof, I have signed my name to this specification.

EMIL KOLLMAR.